United States Patent Office 3,469,123
Patented Sept. 23, 1969

3,469,123
AXIAL AIR GAP POLYPHASE STEPPING MOTOR
WITH DOUBLE BEARING ARRANGEMENT
Seiuemon Inaba, Kawasaki-shi, Ryoko Shirafuji, Tokyo,
Toshio Kojima, Yamato-shi, and Yoichi Amemiya,
Kawasaki-shi, Japan, assignors to Fujitsu Limited,
Kawasaki, Japan, a corporation of Japan
Filed Mar. 6, 1968, Ser. No. 710,801
Claims priority, application Japan, Mar. 17, 1967,
42/16,734
Int. Cl. H02k 37/00
U.S. Cl. 310—49                                        13 Claims

ABSTRACT OF THE DISCLOSURE

Each of a plurality of stages of an axial air gap stepping motor comprises a rotor core coaxially positioned around and affixed to a rotor hub and having a plurality of radially extending magnet poles formed therein. Each stage further comprises a pair of annular stator cores coaxially positioned around the rotor hub in spaced substantially parallel axial relation one on each side of the rotor core and each having a plurality of magnet poles formed therein on its surface facing the other and a stator core excitation winding coaxially positioned around the rotor core in the space between the pair of stator cores. Each of the rotor hubs is coaxially mounted on the motor shaft in a manner whereby the shaft with a double bearing arrangement is freely movable in axial directions and the shaft is rotatable with each of the rotor hubs. The rotor hubs are mounted in a manner whereby they are axially rotatable but immovable in axial directions so that the magnet poles of each rotor core are maintained at a constant distance from the magnet poles of each stator core of the corresponding pair of stator cores. The stator core stages are circumferentially positioned in pitch relative to each other, for example, three degrees or one fifth pole pitch.

DESCRIPTION OF THE INVENTION

Our invention relates to a polyphase step motor. More particularly, our invention relates to a polyphase step motor with constant rotor-stator spacing and is an improvement over the polyphase step motor disclosed in pending United States patent application, Ser. No. 699,081, filed Jan. 12, 1968 for Polyphase Step Motor With Reduced Leakage Flux.

In a polyphase step motor of the type disclosed, the leakage flux in the magnetic circuit may be reduced to thereby increase the magnetic efficiency, the inductance leakage of the windings may be reduced to improve the output torque-frequency characteristic and the inertia of the rotor may be reduced to increase the starting rate. These advantages are attained by the polyphase step motor disclosed in the aforementioned patent application. In a step motor of the disclosed type, the magnet poles of the rotor of each phase or stage of the motor are provided in an axially extending gap between the magnet poles of the corresponding pair of stator cores of said phase or stage and are spaced by equal gaps from the magnet poles of each of said stator cores. Thus, in a step motor of such type, the magnet poles of the rotor and the magnet poles of the stator may collide with each other due to play in the rotor in an axial direction or due to a thrust on the rotor shaft. In order to prevent collisions between the rotor and stator magnet poles, said poles must be kept at least a minimum distance from each other, so that it is impossible to reduce the gap between the magnet poles of each rotor and the magnet poles of each of the corresponding pair of stator cores in order to increase the attractive force.

The principal object of the present invention is to provide a new and improved polyphase step motor.

An object of the present invention is to provide a polyphase step motor with reduced leakage flux in the magnetic circuit and therefore high operating efficiency.

An object of the present invention is to provide a polyphase step motor in which the magnet poles of each rotor and corresponding stator cores cannot collide with each other.

An object of the present invention is to provide a polyphase step motor in which the gap between the magnet poles of each rotor and the magnet poles of each of the corresponding stator cores may be considerably reduced to thereby increase the attractive force.

An object of the present invention is to provide a polyphase step motor in which the gap between the magnet poles of each rotor and the magnet poles of each of the corresponding stator cores is kept constant.

An object of the present invention is to provide a polyphase step motor with reduced leakage flux in the magnetic circuit and reduced rotor inertia, and therefore high efficiency in operation.

An object of the present invention is to provide a polyphase step motor of simple structure.

An object of the present invention is to provide a polyphase step motor which may be readily assembled and disassembled.

An object of the present invention is to provide a polyphase step motor which functions with efficiency, effectiveness and reliability.

An object of the present invention is to provide a polyphase step motor which may be assembled by assembling each stage independently from the others and by then affixing the stages to each other.

An object of the present invention is to provide a polyphase step motor which may be assembled by affixing a number of stages to each other in axial direction, the number of stages being equal to the number of phases.

Another object of the present invention is to provide a polyphase step motor which may be assembled and disassembled without special adjustment by unskilled personnel.

In accordance with the present invention, a step motor has a motor shaft and a plurality of stages. Each of the stages comprises a rotor hub coaxialy mounted on the motor shaft in a manner whereby the shaft is freely movable in axial directions and is rotatable with each of the motor hubs. A rotor core is coaxially positioned around and affixed to the rotor hub and has a plurality of radially extending magnet poles formed therein. A pair of annular stator cores is coaxially positioned around the rotor hub in spaced substantially parallel axial relation one on each side of the rotor core and each has a plurality of magnet poles formed therein on its surface facing the other. The magnet poles of the rotor core and the stator cores correspond to each other. A stator core excitation winding is coaxially positioned around the rotor core in the space between the pair of stator cores. The rotor hubs are mounted in a manner whereby they are axially rotatable but immovable in axial directions so that the magnet poles of each rotor core are maintained at a constant distance from the magnet poles of each stator core of the corresponding pair of stator cores.

The magnet poles of each rotor core are equiangularly spaced from each other and the magnet poles of each stator core are equiangularly spaced from each other. An annular spacer of magnetic material is coaxially positioned around each stator core excitation winding between each corresponding pair of stator cores. The plurality of stages is affixed to each other. A key groove is formed in each of the stator cores and extends in axial direction for keying the stator cores of each of the stages in circumferential position relative to each other. A housing houses the plurality of stages. Annular spacers of non-magnetic material are coaxially positioned around the motor shaft between the rotor hubs of adjacent stages. The magnet poles of each rotor core and of each stator core have the same pitch.

Each of the rotor hubs has an axially extending duct of polygonal cross section formed therethorugh and the motor shaft has a cross section of polygonal configuration corresponding to and cooperating with the duct of each of the rotor hubs in the area of each of the rotor hubs. First and second end flanges are spaced from each other along the motor shaft and clamp the stator cores and rotor hubs between them. Each of the first and second end flanges mounts a first bearing for rotatably supporting the rotor hub and a second bearing for rotatably supporting the motor shaft.

In order that the present invention may be readily carried into effect, it will now be described with reference to the accompanying drawings, wherein.

In the figures, the same components are identified by the same reference numerals.

For purposes of illustration, the polyphase step motor of the present invention is assumed to have five stages so that it functions as a five phase motor.

Figure 1:
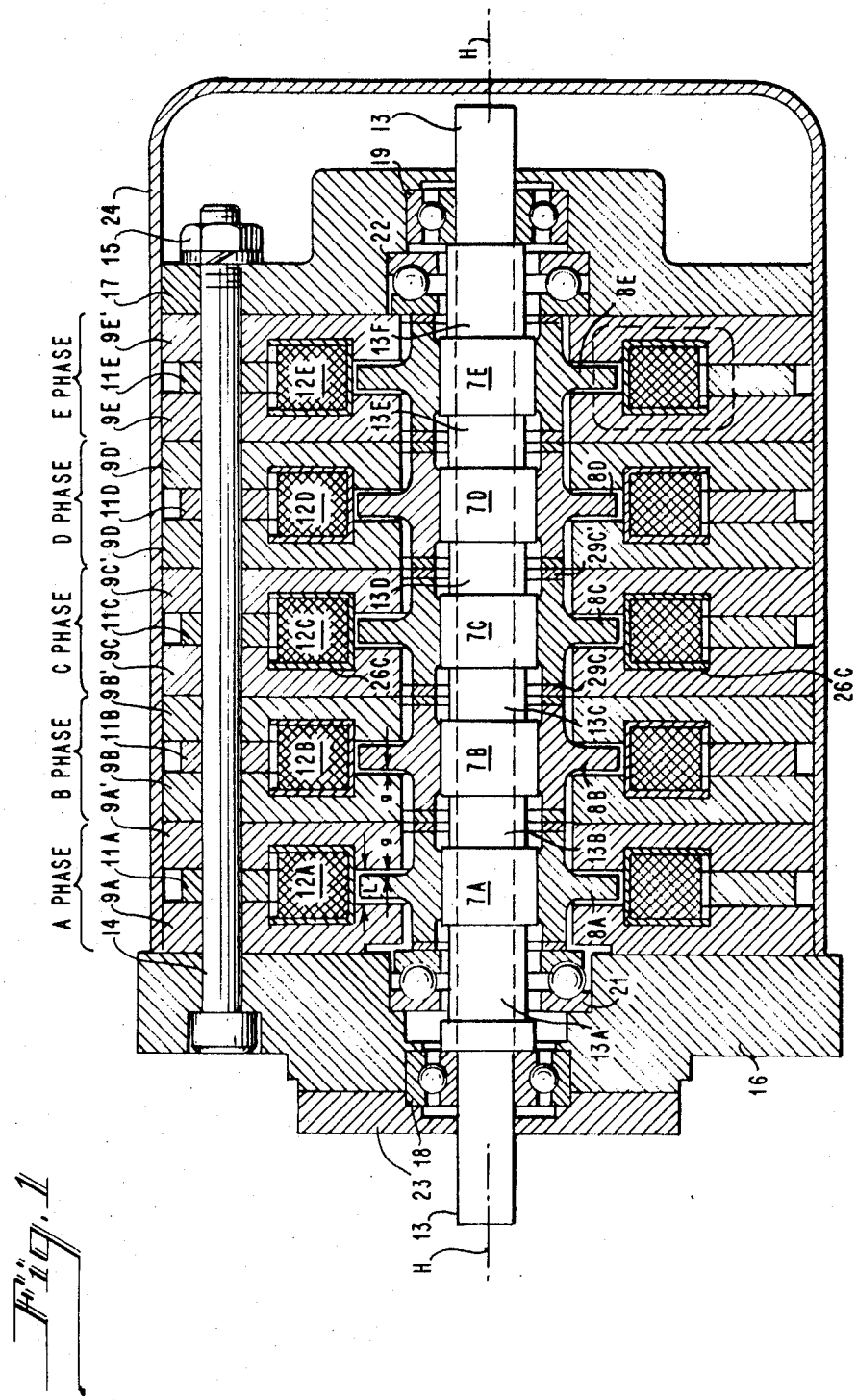
FIG. 1 is a view, partly in axial section, of an embodiment of the polyphase step motor of the present invention.

FIG. 1 discloses the structure of the step motor of the present invention in considerable detail. In FIG. 1, the first stage, and therefore the first phase of the motor, is phase A, the second stage, and therefore the second phase is phase B, the third stage and therefore the third phase is phase C, the fourth stage and therefore the third phase is phase C, the fourth stage and therefore the fourth phase is phase D, and the fifth stage and therefore the fifth phase is phase E. Each of the stages of the motor is assembled independently from the others. Each stage of the motor comprises rotor apparatus and stator apparatus. The rotor apparatus of each stage comprises a rotor shaft or hub 7A, 7B, 7C, 7D and 7E, respectively, and an annular rotor core 8A, 8B, 8C, 8D and 8E, respectively. Each rotor core 8A to 8E is coaxially positioned around and fitted on and affixed to the corresponding rotor shaft 7A to 7E. The rotor cores 8A to 8E are affixed to the corresponding rotor shafts 7A to 7E by any suitable means such as for example, shrink fitting processes.

In accordance with the present invention, each rotor shaft or hub 7A to 7E is of hollow, substantially polygonal cross-sectional, cylindrical configuration. Thus, each rotor shaft 7A to 7E has an axial duct of polygonal cross section extending therethrough from end to end. Each rotor hub 7A to 7E is thus essentially a sleeve.

The stator apparatus of each stage of the polyphase step motor of the present invention comprises two annular stator cores 9A and 9A', 9B and 9B', 9C and 9C', 9D and 9D' and 9E and 9E', respectively. Each stator core comprises magnetic material coaxially positioned around the corresponding rotor shaft 7A to 7E. The stator apparatus of each stage of the motor includes a spacer 11A, 11B, 11C, 11D and 11E, respectively, comprising magnetic material of substantially annular configuration positioned between the corresponding pair of stator cores 9A and 9A' to 9E and 9E'. Thus, the spacer 11A is positioned between the stator cores 9A and 9A' of the first stage, or phase A, of the motor, the spacer 11B is positioned between the stator cores 9B and 9B' of the second stage, or phase B, of the motor, and so on.

The stator apparatus of each stage of the motor includes a stator core excitation winding 12A, 12B, 12C, 12D and 12E, respectively, coaxially positioned around the corresponding rotor shaft 7A to 7E and positioned between the corresponding pair of stator cores 9A and 9A' to 9E and 9E'. Thus, the stator core excitation winding 12A is coaxially positioned around the rotor shaft 7A and is positioned between the pair of stator cores 9A and 9A' in the first stage, or phase A, of the motor, and so on.

In accordance with the present invention, a motor shaft 13 has a plurality of parts 13A, 13B, 13C, 13D, 13E and 13F of polygonal cross-sectional configuration of slightly smaller dimensions than the polygonal cross section of the axial duct through each rotor shaft 7A to 7E, but otherwise identical therewith. The rotor hub 7A is mounted on the parts 13A and 13B of the motor shaft 13 so that said shaft is rotated with said rotor hub, but said shaft is movable in axial directions relative to said rotor hub. The rotor hub 7B is mounted on the parts 13B and 13C of the motor shaft 13 so that said motor shaft is rotated with said rotor hub, but said shaft is movable in axial directions relative to said rotor hub. The rotor hub 7C is mounted on the parts 13C and 13D of the motor shaft 13 so that said shaft is rotated with said rotor hub, but said shaft is movable in axial directions relative to said rotor hub. The rotor hub 7D is mounted on the parts 13D and 13E of the motor shaft 13 so that said shaft is rotated with said rotor hub, but said shaft is movable in axial directions relative said rotor hub. The rotor hub 7E is mounted on the parts 13E and 13F of the motor shaft 13 so that said shaft is rotated with said rotor hub, but said shaft is movable in axial directions relative to said rotor hub.

The stator apparatus of the different stages of the motor are positioned relative to each other along the common axis H of the rotor hubs or shafts 7A, 7B, 7C, 7D and 7E in any suitable manner. The stator apparatus of each stage is positioned relative to the others in circumferential or radial directions by a key (not shown in the figures). The five stages of the motor are firmly affixed to each other by any suitable means such as, for example, a plurality of elongated bolts 14 which are passed through apertures formed through the stator cores 9A, 9A' to 9E, 9E' of the stages, and nuts 15 threadedly coupled to each of said bolts at its end. A coaxially positioned first end flange 16 is affixed by the bolts 14 to one end of the assembled stator cores and a coaxially positioned second end flange 17 is affixed by said bolts to the other end of the assembled stator cores. The motor shaft 13 of the motor is rotatably supported by bearings 18 and 19. The bearings 18 and 19 are mounted in the first and second end flanges 16 and 17, respectively. The parts 13A to 13F of the motor shaft 13 are integrally formed with said shaft and are rotatably supported by bearings 21 and 22. The bearings 21 and 22 are mounted in the first and second end flanges 16 and 17, respectively. A coaxially positioned watertight seal or cover 23 is provided around the motor shaft 13 and is held in position by any suitable means (not shown in the figures). The five stages of the motor are thus covered at one end by the cover 23 and are covered at their opposite end, as well as circumferentially, by a housing 24. The housing 24 may comprise any suitable material.

In order to describe the invention with maximum clarity, a single stage or phase thereof, which, for purely illustrative purposes, is the third stage, phase C or C phase, will be described. The described C phase is essentially identical with the other phases of the motor and is therefore representative of such other phases.

Figure 2:
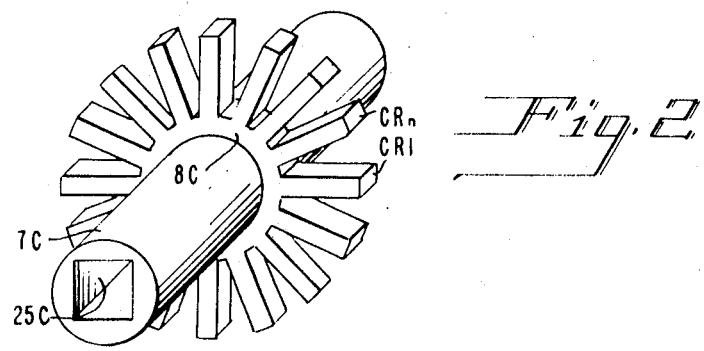
FIG. 2 is a perspective view of a rotor core and its magnet poles of the polyphase step motor of the present invention.

As shown in FIG. 2, the rotor apparatus comprises a rotor shaft or hub 7C and a coaxially positioned rotor core 8C around said rotor shaft and securely affixed to the outer circumference of said rotor shaft or integrally formed with said rotor shaft. The rotor core 8C has a plurality of radially extending magnet poles CR*l* to CR*n* formed therein which are equiangularly spaced and are of equal length. A duct 25C of polygonal cross section is coaxially formed through the hub 8C and extends from end to end thereof.

Figure 3:
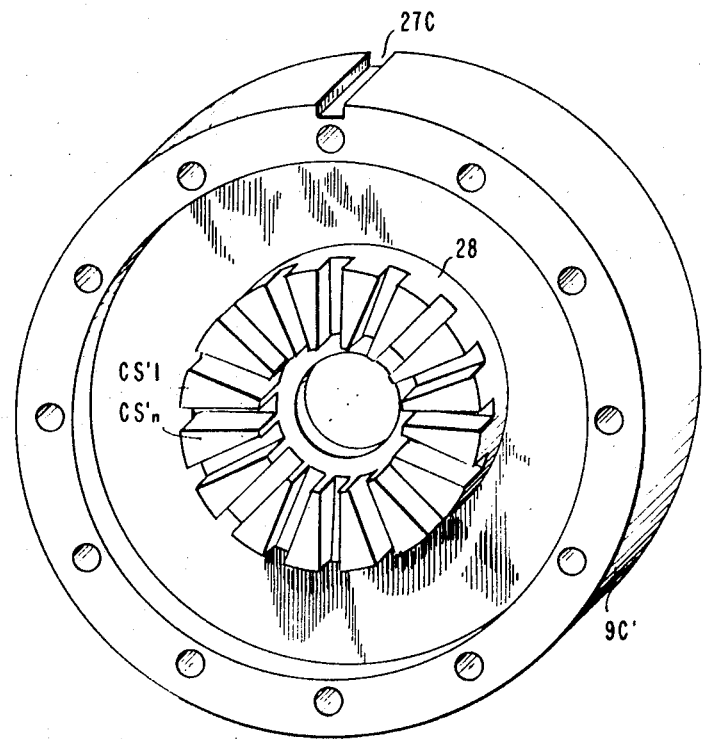
FIG. 3 is a perspective view of a stator core and its magnet poles of the polyphase step motor of the present invention.

The stator apparatus, one stator core 9C′ of which is shown in FIG. 3, comprises a pair of annular or substantially disc-shaped stator cores 9C and 9C′ coaxially positioned around the rotor shaft 7C. The stator cores 9C and 9C′ are spaced from and parallel to each other (FIG. 1).

An annular spacer 11C of magnetic material is coaxially positioned around the rotor shaft 7C between the stator cores 9C and 9C′ (FIG. 1). A stator core excitation winding 12C is coaxially positioned around the rotor core 8C and within the spacer 11C. The stator cores 9C and 9C′ support the annular spacer 11C between them by applying pressure thereto and may be affixed to each other by a plurality of equiangularly spaced bolts (not shown in the figures) which pass through apertures formed through said stator cores. The bolts may be threadedly coupled with the internally threaded apertures through which they pass. The bolts, of course, also pass through corresponding apertures formed through the spacer 11C. The stator cores 9C and 9C′ are thus spaced by a distance determined by the thickness in the axial direction of the spacer 11C.

As shown in FIG. 2, the rotor core 8C has a plurality of radially extending equiangularly positioned magnet poles CR*l* to CR*n* formed therein. Each of the stator cores 9C and 9C′ has a surface facing the other across the space formed by the spacer 11C. As shown in FIG. 3, each of the stator cores 9C and 9C′ on its surface facing the other and facing each corresponding side of the rotor core 8C has formed therein a plurality of equiangularly spaced radially extending magnet poles CS*l* to CS*n* and CS′*l* to CS′*n*, respectively. The magnet poles of each of the stator cores 9C and 9C′ are equal in number to and correspond with those of the rotor core in dimensions.

The annular spacer 11C (FIG. 1) has an axial thickness which is so determined that the magnet poles CR*l* to CR*n* of the rotor are in sufficient proximity with the magnet poles CS*l* to CS*n* and CS′*l* to CS′*n* of the stator cores 9C and 9C′, respectively. The stator core excitation winding 12C is wound on a spool or the like 26C of annular configuration which is coaxially positioned with the rotor shaft 7C and around the rotor core 8C. The spool 26C is positioned in the space between the stator cores 9C and 9C′ between the rotor core 8C and the spacer 11C (FIG. 1). A key groove 27C is formed in each of the stator cores 9C and 9C′ to enable radial or circumferential positioning of the stages of the motor.

FIG. 2 discloses the rotor core 8C of the C stage of the motor in perspective and includes a perspective view. There are *n* magnet poles CR*l* to CR*n* formed in the rotor core 8C. The magnet poles CR*l* to CR*n* are equiangularly spaced from each other and extend radially from the hub of the rotor core in equal radial lengths, in the aforedescribed manner. The rotor magnet poles CR*l* to CR*n* are integrally formed with the rotor core 8C, said rotor core comprising magnetic material, and are firmly affixed to the rotor shaft 7C by any suitable means such as, for example, shrink fitting the hub of said rotor core onto said rotor shaft. The rotor shaft 7C usually comprises a non-magnetic material, but if said shaft is of magnetic material, a cylindrical sleeve-type member of non-magnetic material (not shown in the figures) is coaxially positioned around said shaft interposed between said shaft and the hub of the rotor core 8C to prevent the leakage of magnetic flux to said shaft.

FIG. 3 is a perspective view of the stator core 9C′. In the aforedescribed manner, stator magnet poles CS′*l* to CS′*n* are formed in the surface of the stator core 9C′ which faces the rotor core 8C and the stator core 9C. The stator magnet poles are equiangularly spaced and extend radially in correspondence with the rotor magnet poles CR*l* to CR*n*. The stator magnet poles CS′*l* to CS′*n* are formed in an annular projection 28 which is part of the surface of the stator core 9C′ facing the rotor magnet poles CR*l* to CR*n*. The corresponding stator magnet poles CS′*l* to CS′*n*, as well as the corresponding stator magnet poles CS*l* to CS*n* (not shown in the figures), have a constant pitch and have equal circumferential widths. The stator core 9C is identical in configuration with the stator core 9C′. A pair of annular spacers 29C and 29C′ of non-magnetic material are positioned coaxially around the rotor shaft of each stage on each side of the corresponding hub.

In the illustrated embodiment of the five phase step motor of the present invention, there may be 24 poles, so that *n* equals 24. In such case, the stator cores 9A and 9A′, 9B and 9B′, 9C and 9C′, and the like of the various stages of the motor are shifted one fifth in pitch relative to each other. For this reason, the stator cores of each stage are rotated so that the key grooves or slots 27 such as, for example, the key grooves 27C of the stator cores 9C and 9C′ of the C stage, are provided at positions such that the angle θ (not shown in the figures) between each of said key grooves and a vertical plane through the axis H may be, for example, zero degrees, 3 degrees, 6 degrees, 9 degrees and 12 degrees for the successively positioned pairs of stator cores. This enables the stator cores to be radially or circumferentially positioned relative to each other by a single key.

In the assembling of the polyphase step motor of the present invention, the motor shaft 13 is mounted in the bearing 18 and the bolts 14 are mounted at their heads in the first end flange 16. The stator apparatus and rotor apparatus of the A phase are then mounted on the motor shaft 13 and the bolts 14. The stator and rotor apparatus of each succeeding phase, B, C, D, and E, are then mounted on the motor shaft 13 and the bolts 14. The second end flange 17 is then mounted on the bolts 14 and the nuts 15 are threadedly affixed to the threaded ends of said bolts. The rotor apparatus of the five phases or stages are thus firmly held in position between the bearings 21 and 22 and are unable to move in axial directions.

The spacers 11A to 11E provide a gap L of determined axial dimension between each pair of corresponding stator cores. The rotor magnet poles are properly axially positioned relative to the corresponding stator magnet poles to provide equal gaps *g* between said rotor magnet poles and the magnet poles of each of the corresponding pair of stator cores (FIG. 1). This is accomplished by utilizing a spacing tool or member having a thickness equal to the gap distance *g* to suitably space the magnet poles of each stator core the same distance *g* from the magnet poles of the corresponding rotor core. The facing or abutting surfaces of the rotor hub and the corresponding stator cores are then ground and/or polished to provide such measured axial distance *g* between their magnet poles, prior to the assembly of the motor.

In accordance with the present invention, the rotor apparatus of the five phases are positioned in the assembled motor in a manner whereby said rotor apparatus or the rotor apparatus of any phases is not movable in axial directions, although the motor shaft 13 is freely movable in axial directions and said shaft is rotated with said rotor apparatus. This eliminates axial play in the rotor or stator apparatus and thereby prevents collision between the rotor and stator magnet poles and permits a considerable decrease in the axial magnitude of the gap *g* without increasing the possibility of collision between said magnet poles. The leakage flux is accordingly reduced to a very small amount and the torque is increased considerably.

In operation, the rotors of the phase A to E are rotated step by step by switching the excitation of the stator core excitation windings of the phases in sequence, in the aforedescribed manner.

Since, as hereinbefore described, the magnet poles of the rotor of each stage of the rotor are positioned between corresponding magnet poles of the corresponding two cores of each stage, and the stator cores are spaced from each other, there is substantially no leakage flux when the stator core excitation winding of the stage is energized. Most of the magnetic flux passes only through places between the magnet poles of the rotor core and the corresponding magnet poles of the corresponding pair of stator cores, and such flux thus functions effectively as an attractive force. The provision of radially extending magnet poles on the rotor core of each phase or stage of the motor permits the axial width of the rotor core to be very small in dimension, thereby permitting the rotor inertia to be very small.

Each stator core may be readily fabricated by providing grooves or channels in an annular projected portion provided on the appropriate surface of the stator core. The appropriate surface of the stator core, as hereinbefore described, is that which faces the corresponding surface of the other stator core of each pair of stator cores, both surfaces facing the corresponding rotor core. The stator apparatus of each stage may be readily and facilely assembled by affixing both stator cores of each stage to each other by bolts or the like.

Our polyphase step motor may be assembled with facility, rapidity and accuracy by assembling each stage or phase independently from the others and then interconnecting the various phases.

The rotor hubs 7A to 7E and the hub areas of the rotor apparatus may be made of non-magnetic material in order to eliminate the spacers 29A, 29A' to 29E' of non-magnetic material. Furthermore, the rotor hub of each stage may be coupled to the motor shaft 13 by any suitable device which enables said motor shaft to move freely in axial directions without affecting the rotor hub, but which rotates said shaft with said rotor hubs. A suitable coupling device may comprise, for example, a spline arrangement or an axially extending key projecting radially from the circumference of the motor shaft 13 in its areas 13A to 13F and a cooperating key groove or channel formed in each of the rotor hubs 7A to 7E.

While the invention has been described by means of a specific example and in a specific embodiment, we do not wish to be limited thereto, for obvious modifications will occur to those skilled in the art without departing from the spirit and scope of the invention.

We claim:

1. A step motor having a motor shaft having an axis and a plurality of stages, each of which comprises a rotor hub coaxially mounted on said motor shaft in a manner whereby said shaft is freely movable in axial directions and said shaft is rotatable with each of said rotor hubs; a rotor core coaxially positioned around and affixed to said rotor hub and having a plurality of radially extending magnet poles formed therein; a pair of annular stator cores coaxially positioned around said rotor hub in spaced substantially parallel axial relation one on each side of said rotor core and each having a plurality of magnet poles formed therein on its surface facing the other, the magnet poles of said rotor core and said stator cores corresponding to each other in number; stator core excitation winding means coaxially positioned around said rotor core in the space between said pair of stator cores; and mounting means for mounting the rotor hubs in a manner whereby they are axially rotatable but immovable in axial directions so that the magnet poles of each rotor core are maintained at a constant distance from the magnet poles of each stator core of the corresponding pair of stator cores.

2. A step motor as claimed in claim 1, wherein the magnet poles of each rotor core are equiangularly spaced from each other and wherein the magnet poles of each stator core are equiangularly spaced from each other.

3. A step motor as claimed in claim 1, further comprising an annular spacer of magnetic material coaxially positioned around each said stator core excitation winding means between each corresponding pair of stator cores.

4. A step motor as claimed in claim 1, further comprising means for affixing said plurality of stages to each other.

5. A step motor as claimed in claim 1, further comprising a key groove formed in each of said stator cores and extending in axial direction for keying the stator cores of each of said stages in circumferential position relative to each other.

6. A step motor as claimed in claim 1, further comprising housing means housing said plurality of stages and an annular spacer of magnetic material coaxially positioned around each said stator core excitation winding means between each corresponding pair of stator cores and annular spacer means of non-magnetic material coaxially positioned around said motor shaft between the rotor hubs of adjacent stages, and wherein the magnet poles of each rotor core are equiangularly spaced from each other, the magnet poles of each stator core are equiangularly spaced from each other, and the magnet poles of each rotor core and of each stator core have the same pitch.

7. A step motor as claimed in claim 1, wherein each of said rotor hubs has an axially extending duct of polygonal cross section formed therethrough and said motor shaft has a cross section of polygonal configuration corresponding to and cooperating with the duct of each of said rotor hubs in the area of each of said rotor hubs.

8. A step motor as claimed in claim 1, wherein said mounting means comprises first and second end flanges spaced from each other along said motor shaft and clamping said stator cores and rotor hubs between them.

9. A step motor as claimed in claim 1, wherein said mounting means comprises first and second end flanges spaced from each other along said motor shaft and clamping said stator cores and rotor hubs between them, each of said first and second end flanges mounting first bearing means for rotatably supporting said rotor hubs and second bearing means for rotatably supporting said motor shaft.

10. A step motor as claimed in claim 2, wherein the magnet poles of each rotor core and of each stator core have the same pitch.

11. A step motor as claimed in claim 6, further comprising means for affixing said plurality of stages to each other and a key groove formed in each of said stator cores and extending in axial direction for keying the stator cores of each of said stages in circumferential position relative to each other.

12. A step motor as claimed in claim 9, wherein each of said rotor hubs has an axially extending duct of polygonal cross section formed therethrough and said motor shaft has a cross section of polygonal configuration corresponding to and cooperating with the duct of each of said rotor hubs in the area of each of said rotor hubs.

13. A step motor as claimed in claim 11, wherein said mounting means comprises first and second end flanges spaced from each other along said motor shaft and clamping said stator cores and rotor hubs between them, each of said first and second end flanges mounting first bearing means for rotatably supporting said rotor hubs and second bearing means for rotatably supporting said motor shaft and wherein each of said rotor hubs has an axially extending duct of polygonal cross section formed therethrough and said motor shaft has a cross section of polygonal configuration corresponding to and cooperating with the duct of each of said rotor hubs in the are of each of said rotor hubs.

(References on following page)

References Cited

UNITED STATES PATENTS

| | | | | |
|---|---|---|---|---|
| 2,797,346 | 6/1957 | Ranseen | | 310—46 |
| 3,005,118 | 10/1961 | Ranseen | | 310—49 |
| 3,030,529 | 4—1962 | Jaeschke et al. | | 310—90 X |
| 3,030,529 | 4/1962 | Jaeschke et al. | | 310—90 X |
| 3,293,460 | 12/1966 | Iwai et al. | | 310—49 |
| 3,413,503 | 11/1968 | Parker | | 310—268 |

WARREN E. RAY, Primary Examiner

U.S. Cl. X.R.

310—90, 168, 268